United States Patent
Hsu et al.

(10) Patent No.: US 7,493,454 B2
(45) Date of Patent: Feb. 17, 2009

(54) METHOD FOR ACHIEVING RELIABLE WORM STORAGE USING WMRM STORAGE

(75) Inventors: Windsor Wee Sun Hsu, San Jose, CA (US); Shauchi Ong, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 530 days.

(21) Appl. No.: 10/977,160

(22) Filed: Oct. 29, 2004

(65) Prior Publication Data

US 2006/0095687 A1     May 4, 2006

(51) Int. Cl.
    *G06F 12/14*     (2006.01)
    *G06F 13/00*     (2006.01)

(52) U.S. Cl. .................. 711/152; 711/100; 711/154

(58) Field of Classification Search ............. 711/100, 711/111, 154, 155, 156, 152
See application file for complete search history.

(56) References Cited

U.S. PATENT DOCUMENTS

| | | | | |
|---|---|---|---|---|
| 5,406,529 A | * | 4/1995 | Asano | 365/230.03 |
| 6,308,265 B1 | * | 10/2001 | Miller | 713/2 |
| 2002/0161991 A1 | * | 10/2002 | Shi et al. | 713/1 |
| 2005/0160440 A1 | * | 7/2005 | Matsuda et al. | 720/645 |

* cited by examiner

*Primary Examiner*—Tuan V. Thai
(74) *Attorney, Agent, or Firm*—Mark C. McCabe; Lewis Nunnelley

(57) ABSTRACT

The disclosure provides a method for ensuring that data stored on rewritable storage is immutable. The method includes initializing selected user-addressable blocks of storage to a writable state. In addition, the method includes accepting data to be stored in specified user-addressable blocks. Also, the method includes determining if the specified block(s) is writable. Also, the method includes storing the accepted data to the rewritable storage. Moreover, the method includes setting the state of the specified block(s) to non-writable. Each user-addressable block of storage is mapped to at least one block of rewritable storage and initializing selected user-addressable blocks of storage to a writable state includes storing predetermined bit patterns into the corresponding blocks of rewritable storage such that for each selected user-addressable block of storage, the contents of the corresponding blocks of rewritable storage satisfy a predetermined mathematical relationship.

8 Claims, 9 Drawing Sheets

| A | B | C | F |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 1 |

METHOD FOR ACHIEVING RELIABLE WORM STORAGE USING WMRM STORAGE

FIELD OF THE INVENTION

The present invention relates to a new storage method and system for enforcing WORM property on WMRM storage.

BACKGROUND OF THE INVENTION

As critical data is increasingly stored in electronic form, it is imperative that it be stored reliably in a tamper-proof manner. Furthermore, a growing subset of electronic data (e.g., electronic mail, instant messages, drug development logs, medical records) is subject to regulations governing its long-term retention and availability. Recent high-profile accountability issues at large public companies have further caused regulatory bodies such as the Securities and Exchange Commission (SEC) to tighten their regulations. For instance, SEC's new Rule 17a-4, which went into effect in May 2003, specifies storage requirements for email, attachments, memos and instant messaging as well as routine phone conversations. The key requirement in many such regulations is that data must be stored reliably in non-erasable, non-rewritable storage such that once the data is written, it cannot be altered or overwritten. Such non-rewritable storage is commonly referred to as WORM (Write-Once Read-Many) storage as opposed to WMRM (Write-Many Read-Many) storage, which can be written many times.

Traditionally, WORM storage is implemented by using optical means to cause an irreversible change in a storage medium (e.g.,WORM optical disc, CD-R, DVD-R). Because of market forces and physical and/or technological constraints, WORM optical storage has not been improving much and is unlikely to improve much in performance and/or storage density. Organizations thus must store their rapidly growing volumes of critical records on an increasingly large number of WORM optical discs. Managing such a large number of discs is a massive, time-consuming, error-prone and expensive process. More importantly, records pertinent to a data discovery request cannot be easily located within such a system and delivered in a timely fashion.

A recently introduced alternative to WORM optical storage is the WORM tape. The WORM tape is slow and does not allow direct random access to the data. Instead, data has to be appended and read sequentially. Although write-once (reference) data is sometimes described as read-rarely or read-never, there are many environments where read performance does matter. Moreover, when discovery requests for data arrive, the data needs to be readily accessible, in random and sequential modes depending on the application.

Another alternative to WORM optical storage is content-addressable storage (CAS). CAS achieves the effect of write-once storage by storing data at a location that is uniquely determined by the data being written. Such a system, however, requires a new storage interface and extensive changes to applications and system software to carefully track and manage the locations at which data is written.

SUMMARY OF THE INVENTION

According to the present disclosure, there is provided a method for ensuring that data stored on rewritable storage is immutable. The method includes initializing selected user-addressable blocks of storage to a writable state. In addition, the method includes accepting data to be stored in specified user-addressable blocks. Also, the method includes determining if the specified block(s) is writable. Also, the method includes storing the accepted data to the rewritable storage. Moreover, the method includes setting the state of the specified block(s) to non-writable. Each user-addressable block of storage is mapped to at least one block of rewritable storage and initializing selected user-addressable blocks of storage to a writable state includes storing predetermined bit patterns into the corresponding blocks of rewritable storage such that for each selected user-addressable block of storage, the contents of the corresponding blocks of rewritable storage satisfy a predetermined mathematical relationship.

BRIEF DESCRIPTION OF THE DRAWINGS

FIG. 6 is a truth table associated with a three input majority gate

DETAILED DESCRIPTION

The invention will be described primarily as a system and method for achieving reliable WORM storage using WMRM storage. In the following description, for purposes of explanation, numerous specific details are set forth in order to provide a thorough understanding of the present invention. It will be evident, however, to one skilled in the art that the present invention may be practiced without these specific details.

Those skilled in the art will recognize that an apparatus, such as a data processing system, including a CPU, memory, I/O, program storage, a connecting bus and other appropriate components could be programmed or otherwise designed to facilitate the practice of the invention. Such a system would include appropriate program means for executing the operations of the invention.

An article of manufacture, such as a pre-recorded disk or other similar computer program product for use with a data processing system, could include a storage medium and program means recorded thereon for directing the data processing system to facilitate the practice of the method of the invention. Such apparatus and articles of manufacture also fall within the spirit and scope of the invention.

The invention provides for cost-effective WORM storage offering high storage density and good performance. The present invention addresses such a need by a system and method for reliably enforcing the WORM property on WMRM storage, which is fast, dense and rapidly improving.

Figure 1:
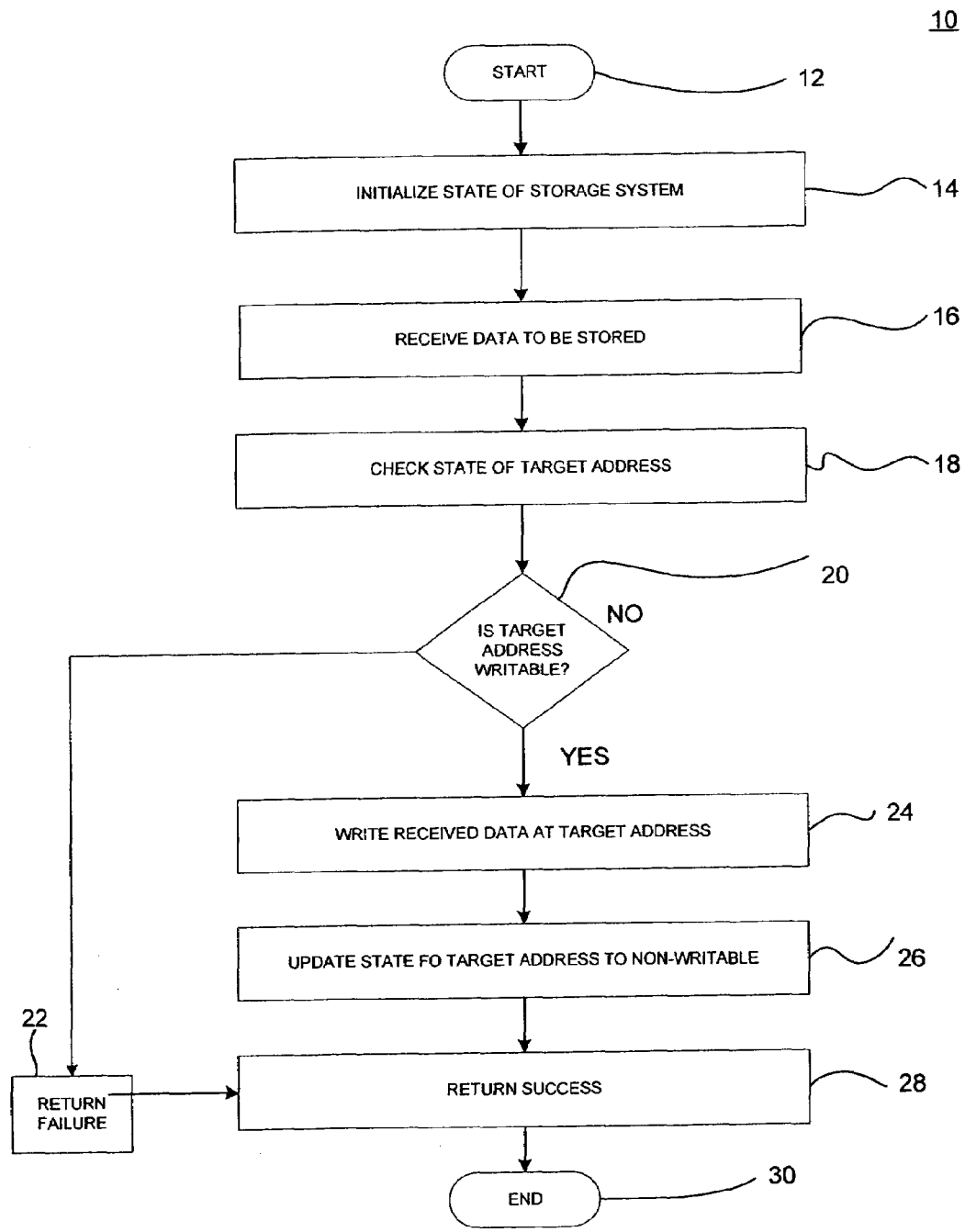
FIG. 1 is a flowchart showing a method of providing the WORM property on WMRM storage system.

FIG. 1 is a flowchart illustrating a method 10 of providing the WORM property on WMRM storage system. At block 12, method 10 begins.

At block 14, the state of the storage system is initialized. The initialization provides for initializing the state of the storage system so that every block of storage is writable or that some specified blocks of storage are writable.

At block 16, data to be stored in the storage system is received.

At block 18, the target address at which the data is to be stored within the storage system is identified.

At block 20, a determination is made as to whether the target address is writable. If no, then at block 22 a failure is returned. If yes, then at block 24, the received data is written to the target address.

At block 26, the state of the target address to which the received data was written, is updated to non-writable.

At block 28, a message acknowledging a successful write of the received data is returned.

At block 30, method 10 ends.

In one embodiment, method 10 further includes an additional step whereby the updated state and/or the data written are read back and verified to ensure that they have been successfully stored. If a discrepancy is detected, the system retries the corresponding operations and re-verifies that they have been successfully carried out. After a predetermined number of retries, the system returns a write failure.

Direct access to the state is restricted so that once a block is in the non-writable state, it's state is protected from being changed back to writable. Typically, the state initialization is performed only once in the factory. Subsequently, the only mechanism available to update the state is to turn it into non-writable during a write of the corresponding block. Alternatively, the state of a block may be locked for a certain duration. In one embodiment, the duration is dependent on the retention period of the data stored. In the next section, we will describe several methods for reliably maintaining the state of the storage blocks and checking the state before performing any write. Note that in some environments, it is desirable to return an error on an attempted read of a block that has not been written. In such environments, the state of the requested block is checked on a read, and a failure is returned if the state is writable. In the following, we focus on describing the write operations.

External Non-Rewritability

In one embodiment, the state of the storage blocks are kept external to the data being stored. The system utilizes a data structure such as a list, hash table or bitmap to track which blocks are writable (or non-writable). For ease of illustration, a bitmap is used, wherein each bit corresponds to a storage block and the value of the bit indicates whether the corresponding storage block is writable.

The bitmap is stored in the storage system, typically in a non-user-addressable portion. To reduce the chances that the state could be corrupted and the WORM property circumvented, the system maintains checksums or some other mathematical function of the bits in the bitmap and stores them securely in a non-user-addressable portion of the storage system. All updates to the bitmap and checksums are written to persistent storage.

On initialization, the bits in the bitmap are set to one, indicating that the corresponding blocks are writable. To check the status of a storage block, the system looks up the corresponding bit in the bitmap. It also recomputes and verifies that the corresponding checksum is valid. In one embodiment, a block is writable only if the corresponding bit is one and the corresponding checksum is valid. To set the state of a storage block to non-writable, the system sets the corresponding bit to zero and updates the corresponding checksum.

To improve performance, the bitmap and checksums are stored in a distributed fashion in the storage system so that the bits and checksums are located close to their corresponding storage blocks. For example, the first few sectors (blocks) of a disk cylinder can be used to store the bitmap and corresponding checksum for the other sectors in the cylinder. If the disk supports physical sector sizes (e.g. 524 bytes) that are slightly larger than the logical (user-addressable) sector size (e.g. 512 bytes), the bit corresponding to each logical sector can also be stored in the same physical sector as the data contents of the logical sector.

In this embodiment, the write-once property is enforced by a mechanism that is separate from the actual storage of the data.

Intergal State

In another embodiment, the state of the storage blocks is encoded and kept in the data being stored. As a result, if the data is successfully stored, so is the state used to ensure that the data is not over-written.

Figure 2:
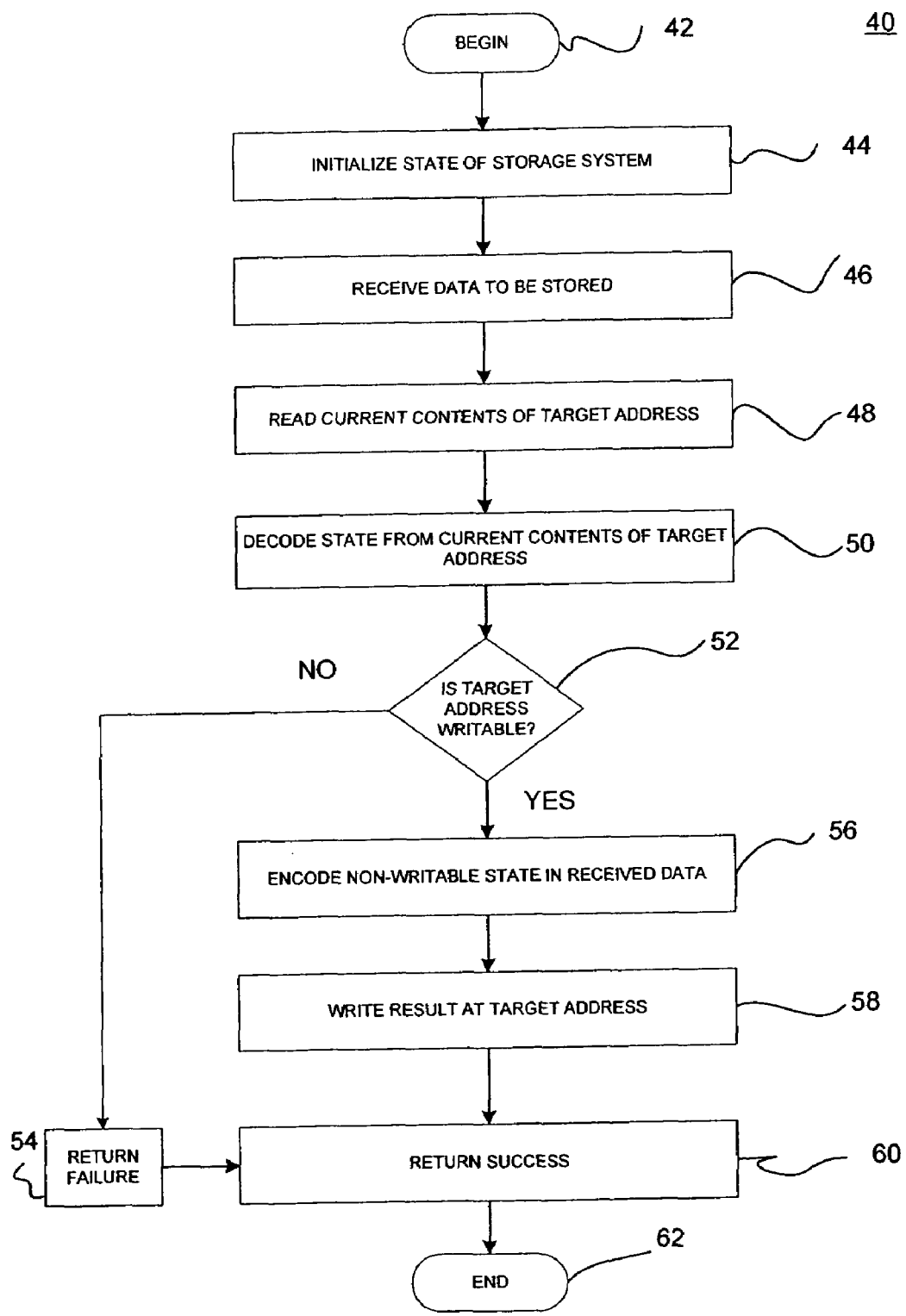
FIG. 2 is a flowchart showing a method of providing the WORM property on WMRM storage system, where state information is encoded and stored in the data.

FIG. 2 is a flowchart illustrating a method 40 of providing the WORM property on WMRM storage system, where state information is encoded and stored in the data. At block 42, method 40 begins.

At block 44, the storage system initializes the storage blocks. The initialization provides for initializing the state of the storage system so that every block of storage is writable or that some specified blocks of storage are writable.

At block 46, the storage system receives data to be stored at a target address.

At block 48, the current contents of the target address are read.

At block 50, state information associated with the current contents of the target address is decoded.

At block 52, a determination is made as to whether the target address is writable. If the target address is determined to be not writable, then at block 54, a failure is returned in response to the write request. If the target address is determined to be writable, then at block 56, non-writable state information is encoded in the data to be stored at the target address.

At block 58, the data, including the encoded state information, is written to the target address.

At block 60, a message confirming that the data has been successfully written is returned.

At block 62, method 40 ends.

In one specific embodiment, the initialization (see block 40) is performed by storing a predetermined bit pattern in the storage blocks to be initialized, and the target address is determined to be writable if the current contents of the target address include the predetermined bit pattern.

A shortcoming of this embodiment is that the predetermined bit pattern cannot be stored in a non-rewritable manner. A solution is to detect when the system is asked to store the predetermined bit pattern and to then change the data to some other predetermined bit pattern. For example, in legal documents, blank pages are not left empty but are instead labeled as "intentionally left empty". Another option is to simply let the predetermined bit pattern be rewritable. By increasing the length of the predetermined bit pattern, the probability that it will be encountered in the data stream can be greatly reduced.

For example, with an 8-byte predetermined bit pattern, the probability that the predetermined bit pattern will be encountered is only 1 in $2^{8 \times 8} = 5.4 \times 10^{-2°}$.

In another embodiment, the initialization (see block 40) is performed by storing a predetermined bit pattern at a predetermined location within each storage block to be initialized, and the target address is determined to be writable if the current contents of the target address include the predetermined bit pattern at the predetermined location.

In yet another embodiment, each user-addressable or logical block of storage is mapped by the system onto multiple physical blocks of storage, each preferably in an independent failure domain. For example, each of the physical blocks corresponding to a logical block can be from a separate disk or disk array. The system uses the relationship among the contents of the corresponding physical blocks to encode the state of the logical block. In addition, the data stored can be retrieved from any one of the corresponding physical blocks, thereby greatly increasing the reliability of the system. In one embodiment, each logical block of storage is mapped onto two physical blocks.

The system is initialized such that the contents of each pair of physical blocks corresponding to a logical block satisfy a certain mathematical relationship f. For instance, if the first physical block contains a bit pattern x, the second physical block would contain the logical negation of x. When a block of data is to be written to a logical block, the system reads the current contents of the corresponding physical blocks. If the contents satisfy the predetermined mathematical relationship f(e.g., logical negation), the logical block is writable. Otherwise, the logical block is not writable. If the logical block is writable, the system proceeds to write the data into both the physical blocks. More generally, some mathematical function of the data is written to each of the two physical blocks such that the data in the two physical blocks satisfy a mathematical relationship other than f. When a logical block is to be read, the system can read from either one of the corresponding physical blocks. Alternatively, to increase reliability, it reads from both the physical blocks and verifies that the contents of the two physical blocks satisfy a valid relationship.

Such a system offers a very strong guarantee that any data stored in the system cannot be overwritten because the writable/non-writable state of a logical block is updated by the actual act of storing the data.

Integral State and Test

Figure 3:
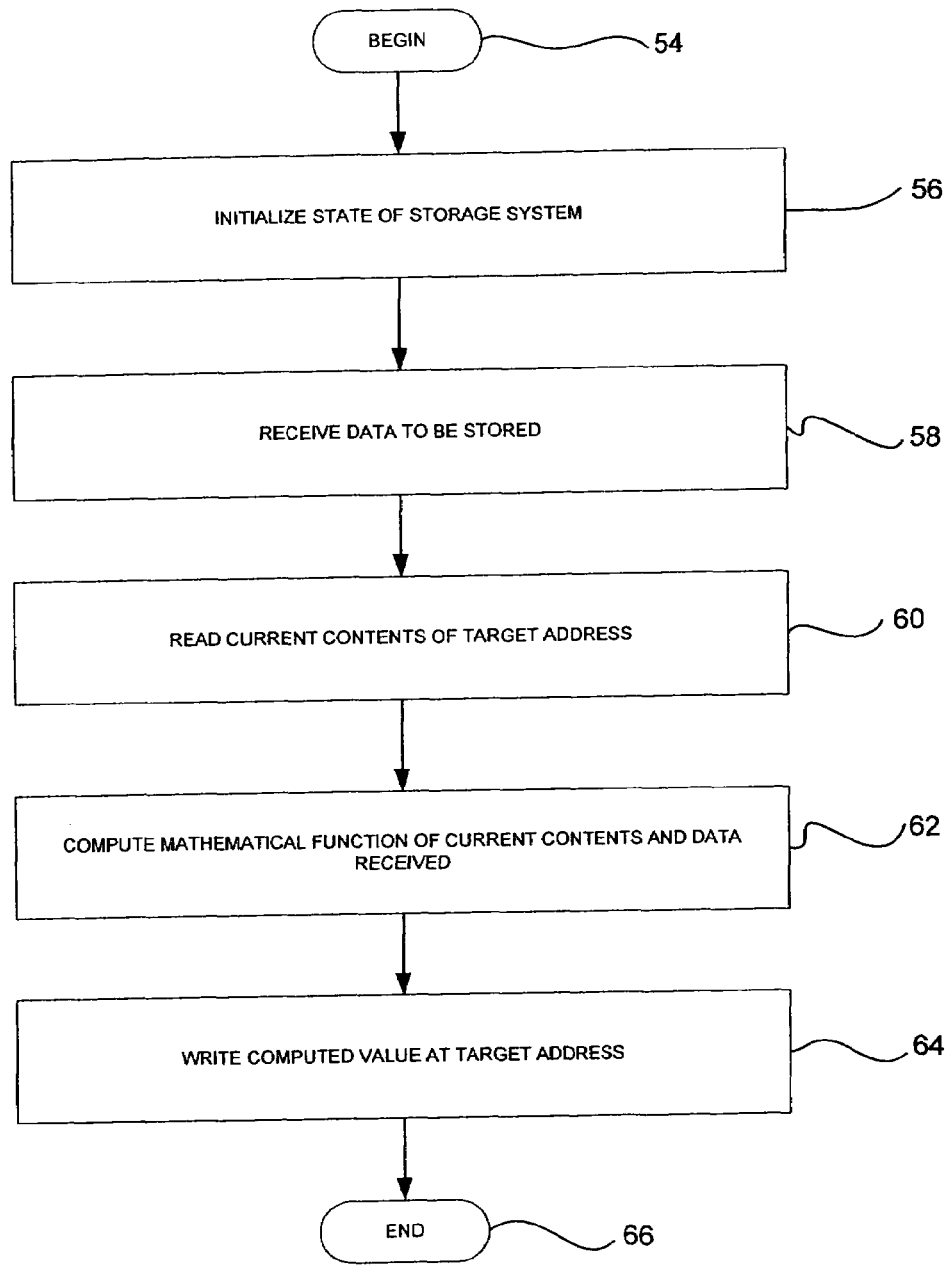
FIG. 3 is a flowchart showing a method of integrating a state-test and a state-update mechanism with a data store operation so that once the data is successfully written, it cannot be overwritten.

FIG. 3 is a flowchart illustrating a method 70 of integrating a state-update and a state-test mechanism with a data store operation so that once the data is successfully written, it cannot be overwritten. In other words, through method 70, the act of writing the data guarantees the WORM property. At block 72, method 70 begins.

At block 74, the state of the storage system is initialized. The initialization provides for initializing the state of the storage system so that every block of storage is writable or that some specified blocks of storage are writable.

At block 76, the storage system receives data to be stored.

At block 78, the current contents of the target address at which the received data is to be stored, is read.

At block 80, a mathematical function of the data to be stored and the current contents of the target address (see block 78) is computed.

At block 82, the computed mathematical function is written to physical blocks identified by the target address.

At block 84, method 70 ends.

In one embodiment, each user-addressable or logical block of storage is mapped by the system onto multiple physical blocks of storage, each preferably in an independent failure domain. For example, each of the physical blocks corresponding to a logical block can be from a separate disk or disk array. In addition, the data stored can be retrieved from any one of the corresponding physical blocks, thereby greatly increasing the reliability of the system.

In one specific embodiment, each logical block of storage is mapped onto two physical blocks. The system is initialized such that the contents of each pair of physical blocks corresponding to a logical block satisfy a certain mathematical relationship f. For instance, if the first physical block contains a bit pattern x, the second physical block would contain the logical negation of x.

Figure 4A:
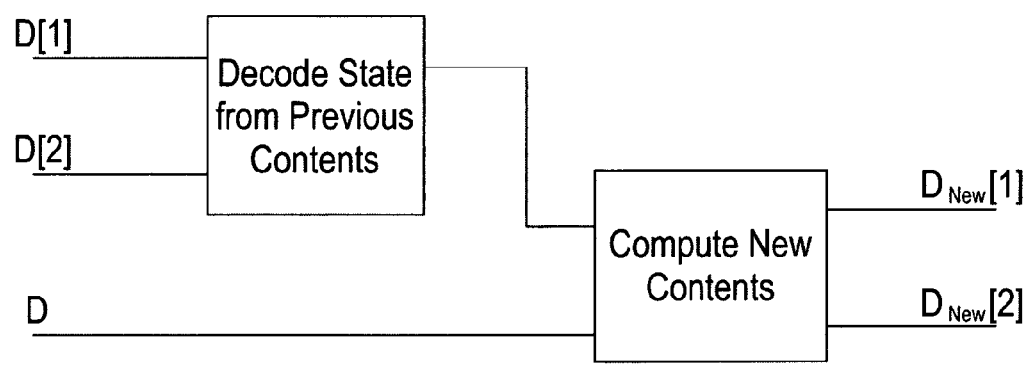
FIG. 4A is a diagram showing a sample decomposition of a composite mathematical function of the previous contents of a storage location and received data to be stored at the storage location.
Figure 4B:
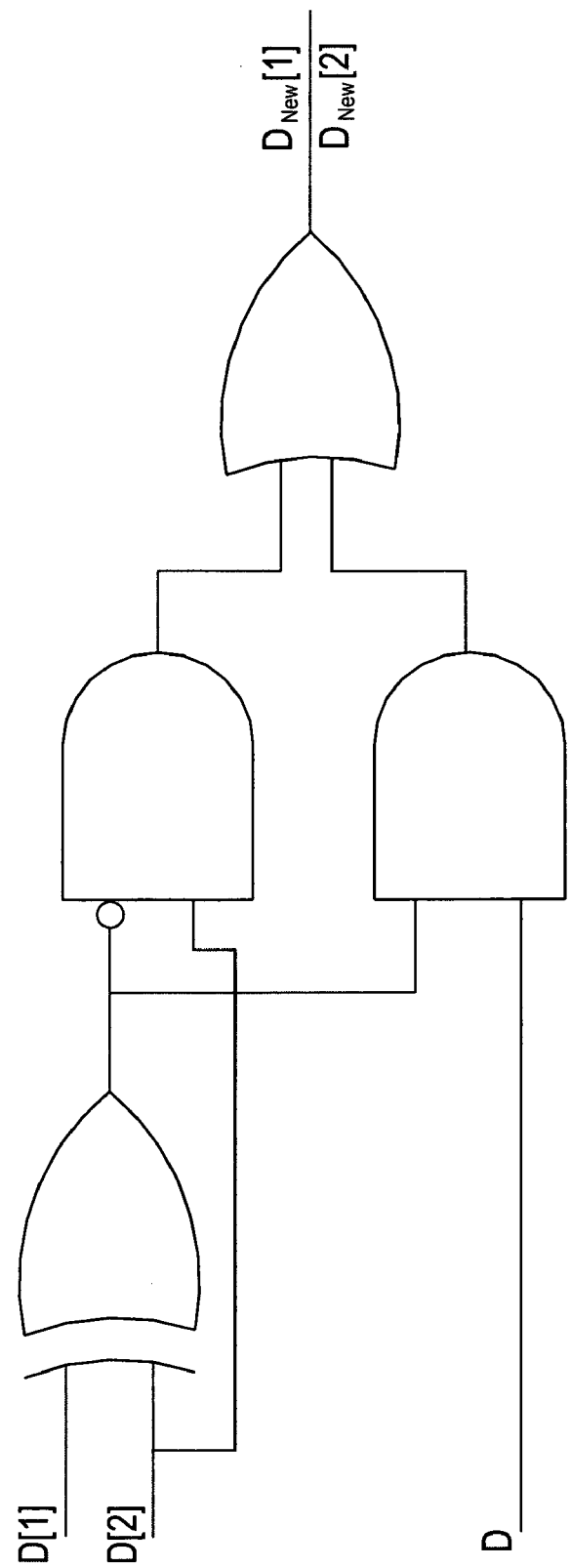
FIG. 4B is a diagram showing a sample implementation of a composite mathematical function of the previous contents of a storage location and received data to be stored at the storage location.

The mathematical function (see block 80) can be a multi-step function, comprised, for instance, of a function of the previous contents, and a further function of the received data, as illustrated by the example in FIG. 4A. The mathematical function can be implemented in either software (using ALU operations) or hardware (using logic gates), as shown in the example in FIG. 4B.

In the preferred embodiment, the mathematical function is a bit-wise majority vote, meaning that each bit in the computed value is one (zero) only if the majority of the corresponding input bits are one (zero). The system is initialized such that the majority vote of the contents of each set of physical blocks corresponding to a logical block is zero. When each logical block is mapped to two physical blocks, this means that the system is initialized such that the contents of each pair of physical blocks corresponding to a logical block satisfy logical negation.

Figure 5A:
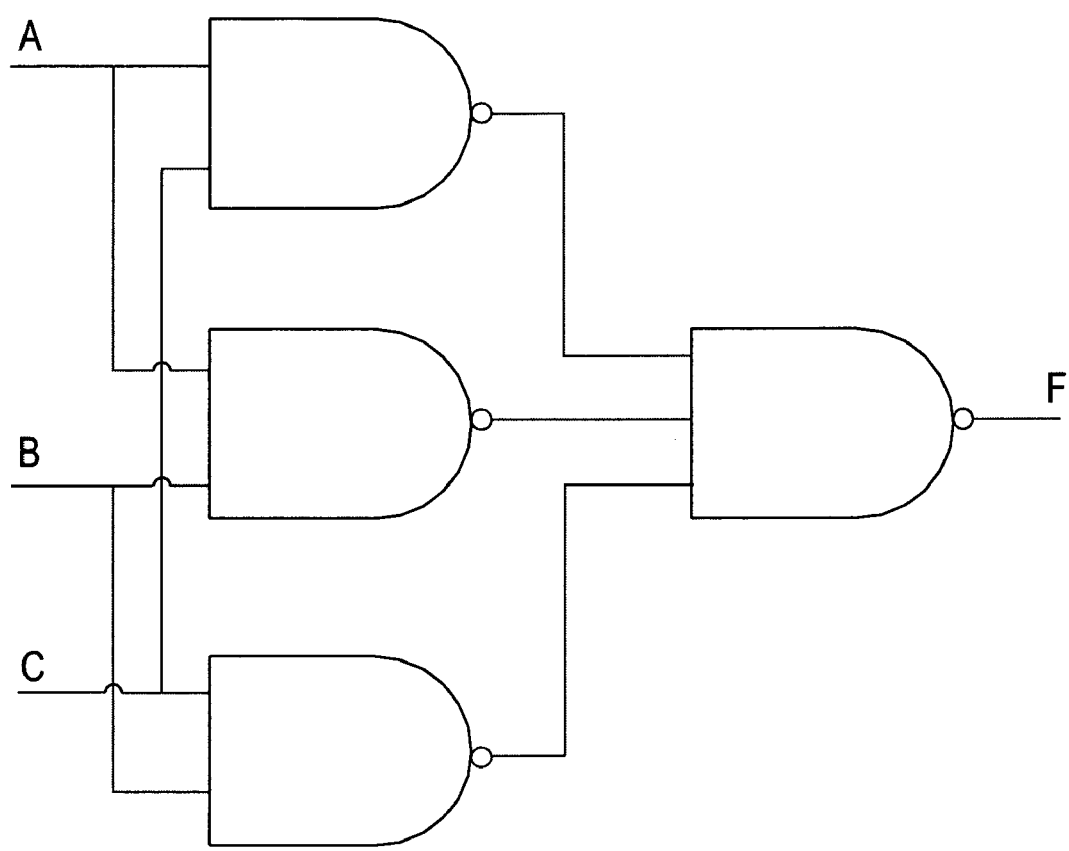
FIG. 5A is a diagram showing a three input majority gate using NAND gates or ALU operations.
Figure 5B:
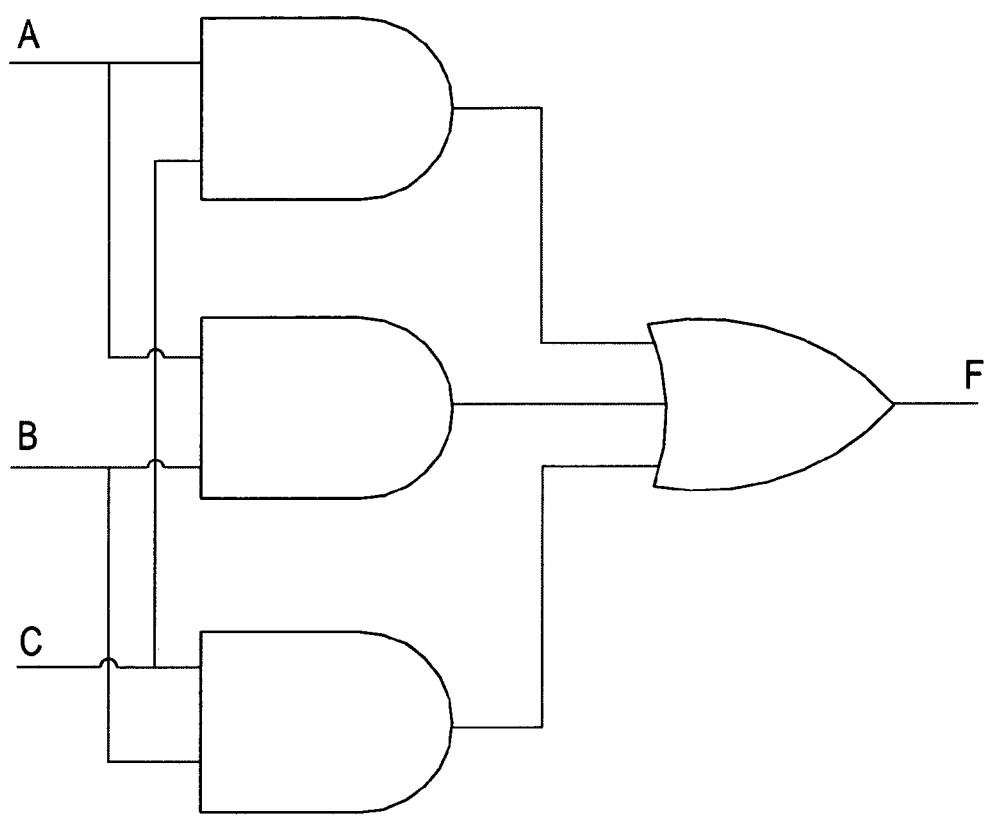
FIG. 5B is a diagram showing a three input majority gate using AND/OR gates or ALU operations.

The majority vote can be realized easily in either software or hardware, for example, by using the combination of gates/ALU operations shown in FIG. 5A or FIG. 5B, or a lookup table implementing the truth table, shown in FIG. 6. Note that a typical implementation would perform the operation on several bits (e.g.,32 bits) in parallel.

In one embodiment, after writing the computed value to both the physical blocks (see block 82), the system reads back the contents of the physical blocks to verify that the data has been successfully stored. If the contents are different from the data to be stored, the system returns a write failure. Otherwise, it acknowledges that the write has been successfully carried out.

Note that in this method, previously written data may be rewritten with the same value. The system has to ensure that the contents of the physical blocks are valid even if the rewriting process is interrupted. A known approach is to make sure that block writes are effectively atomic.

Fine-Granularity WORM

The fact that the underlying storage allows rewrite means that the system can actually read a block that has already been written, add data to it, and then write it again. In other words, the system can effectively achieve the write-once property at a finer granularity than the minimum write unit of the underlying storage. Furthermore, the system allows random blocks to be written. These properties enable the system to store data and the metadata that describes the data in much more flexible ways than traditional optical WORM storage, which typically requires data to be written in sequential blocks.

To support such fine-granularity WORM in the external non-rewritability embodiment, the system maintains a writable/non-writable bit at a granularity smaller than the block size. For example, a bit for every 8 bytes. In this case, a given 8 bytes of storage can only be written if its corresponding bit indicates that it is writable. In the embodiment that uses a predetermined bit pattern to indicate writability, a unit of storage can only be written if it currently contains the predetermined bit pattern. The WORM granularity in this case has to be at least the size of the bit pattern. The embodiment that maintains the writable/non-writable state of the storage blocks by using the relationship between the contents of the corresponding physical blocks can be extended without additional cost to enforce the write-once property at an arbitrarily fine granularity. Specifically, for each bit of storage, the system checks the corresponding bit in the two copies to see if they obey the relationship that indicates it can be written. In the integral state and test embodiment, the system simply performs the majority vote on the bits to be written.

For example, suppose that the system receives the following write command, write(target block address A, data D, offset o, length l. It checks the state of the bytes between o (inclusive) and o+l of logical block A by first reading the contents of the two physical blocks corresponding to A into D[1] and D[2], and then determining the relationship between the corresponding bytes in D[1] and D[2]. If all the l bytes are writable, the system replaces the corresponding bytes in D[1] and D[2] by D and write D[1] and D[2] back to the respective physical blocks. Otherwise, it returns a failure. On receiving a read command such as read(target block address A, data D, offset o, length l), the system returns the contiguous non-writable bytes starting at A+o and ending before A+o+l, and the number of such bytes.

Such an extension allows an application to repeatedly and incrementally append data to an object stored on WORM storage. This enables applications to efficiently log events in a non-alterable manner and is the key to maintaining a strong audit trail, as required by some regulations. If an application keeps the last block of an object in memory, whenever it appends data to the object, it would be more convenient to simply issue a write of the last block with a new length. To support such usage, the current system would further consider a byte to be writable if its value in the current contents is identical to the new value.

For instance, suppose that the system receives the following write command, write(target block address A, data D, length l). It reads the current contents of the two physical blocks corresponding to A into D[1] and D[2]. The system next calculates a mathematical function (e.g., bit-wise majority vote) of the first l bytes of D, D[1] and D[2] and stores the result back in the first l bytes of D[1] and D[2]. Next, the system writes D[1] back to the first physical block corresponding to A and D[2] to the second. Finally, the system reads back the current contents of the two physical blocks and verifies that the first l bytes are identical to D. Alternatively, before the system performs the write of D[1] and D[2], it checks to see if the first l bytes of D[1]/D[2] are identical to the first l bytes of D. If not, the system returns a failure.

Note that fine-granularity WORM provides the ability to update an arbitrary granule within a block. Simply appending data to a block is a special case that can be optimized to require fewer state bits. For example, a predetermined bit pattern can be written to the beginning of every block when the system is initialized. The predetermined bit pattern marks the position at which data can be appended. When data is written to a block, the system first finds the location of the predetermined bit pattern. Then it adds the new data to that location and pushes the bit pattern back. If the bit pattern cannot be found or the space remaining is insufficient for the new data, the system returns a failure.

In describing fine-granularity WORM, we have used a read/write interface that explicitly specifies the byte length and/or offset of the data. It should be apparent that such information can be encoded into the other fields, especially if the invention is to be implemented using an existing block interface. For example, the byte length can be encoded into the last word of a block. A full-block request would then have to be broken up into two requests. Alternatively, the encoding could be such that the last word contains the length only when another field has a certain property. For instance, if the most significant bit of the block address is not used, it can be set to one to indicate that the length is in the last word of the block. If the existing interface has a block count, we can use its most significant bit to indicate that the length is in the last word of the transferred data. If the block count is so large that it uses the most significant bit, we split the request into two.

Reliability

If the storage media is removable, as are most optical WORM media, drive failures do not cause data to be lost because the media can be removed and read with another drive. For non-removable storage media such as hard disks, however, a disk failure means that the data stored on that disk is lost. A common approach of protecting against data loss due to disk failures is to use RAID. The basic idea is to maintain some redundant information of the data stored so that when disks fail, the data stored on those disks can be reconstructed by using the data on the other disks and/or the redundant information.

With the current invention, the system has to further ensure that the writable/non-writable state of the blocks is protected against loss. When the writable/non-writable state is stored as data in the underlying storage, it is protected by the standard RAID schemes used in the underlying storage. When the writable/non-writable state depends on the mathematical relationship between copies of data, the RAID schemes may be enhanced to better protect the state.

In one embodiment, the system comes from the factory initialized such that all the blocks are writable. The system is sealed so that there is no way to directly access the underlying WMRM storage or to directly manipulate the writable/non-writable state of the storage blocks.

Figure 7:
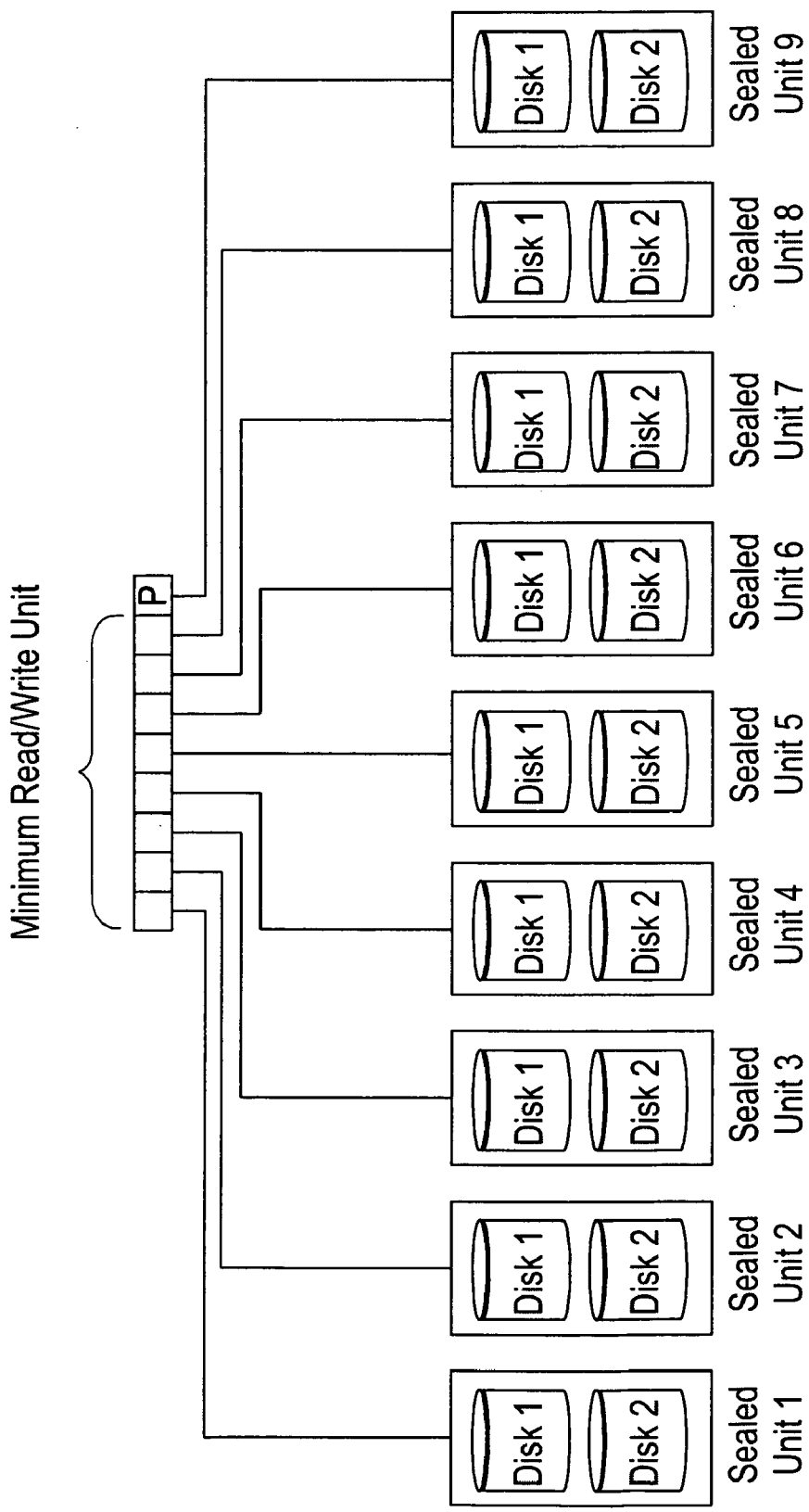
FIG. 7 is a diagram illustrating an exemplary embodiment of the present invention.

In the exemplary system shown in FIG. 7, there can be multiple sealed units, in which each sealed unit contains a pair of disks initialized such that one of the disks contains the logical negation of the contents of the other disk. The sealed units are arranged in an array and data is striped across the units. To protect against unit failures, an error correcting code is computed and stored on one or more additional units in the array. For ease of illustration, we use bit-level striping with parity (RAID-3) in the discussion here. It should be apparent that the same ideas apply when data is distributed in other ways across the sealed units (e.g., RAID 4/5) and when other error-correcting codes are used (e.g., Reed-Solomon Code) so long as a whole stripe of data is written at a time.

In such an arrangement, data is mirrored within each sealed unit, and is also protected by the RAID parity. Data would only be lost when there are two or more sealed units with failure of both disks. The writable/non-writable state is mirrored across all the units in the array and would only be lost when all the units suffer at least one disk failure. Such a system is therefore extremely reliable and can tolerate the failure of any three disks and the failure of up to n disks, where n is the number of sealed units.

The recovery process for a failed unit operates as follows. First, for each block to be recovered, the corresponding block is read from each of the other units in the array. Using the interface specified earlier, this would mean issuing the command read(target block address A, data D, length l) to each of the other units, where A is the block address to be recovered. Second, the length l returned from each of the fully functional units (units with no disk failures) is checked for consistency and denoted by 1_. Third, the XOR of the corresponding first 1_ bytes of each of the returned data is computed and denoted by D_. Finally, the computed data is written to the replacement unit by the command write(target block address A, computed data D_, length 1_).

When only one of the disks in a unit has failed, the recovery process can be more efficiently performed as follows. First, the data in the block to be recovered is read from the partially-failed unit. Second, the state of the block is determined by reading the corresponding block from a fully-functional unit. Finally, the data and its state is written to a replacement unit. Using the above interface, this would involve issuing the following commands: (1) read(target block address A, data D_) to the partially-failed unit; (2) read(target block address A, data D, length 1_) to a fully-functional unit; and (3) write(target block address A, data D_, length 1_) to the replacement unit.

Note that when servicing a read request, the corresponding parity is read and recomputed to verify the integrity of the data. In environments where the verification is not required, the parity can be distributed evenly among all the units in the array to balance the workload on each unit, as in RAID-5.

While the discussion above focuses on describing the various embodiments of external non-rewritability, integral state, and integral state and test, separately, it is to be understood that the principles can be applied in combination to achieve a stronger protection against data overwrite. It is also to be understood that while the discussion above focuses on hard disks, the same principles for enforcing the WORM property on WMRM storage apply when the WMRM storage is made up of other storage devices/systems such as MRAM and MEMS, and combinations (e.g. arrays) of storage devices/systems.

Further, while the particular SYSTEM AND METHOD FOR ACHIEVING RELIABLE WORM STORAGE USING WMRM STORAGE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a system or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A method for ensuring that data stored on rewritable storage is immutable, including:
   initializing selected user-addressable blocks of storage to a writable state;
   accepting data to be stored in specified user-addressable blocks;
   determining if the specified block(s) is writable;
   storing the accepted data to the rewritable storage; and
   setting the state of the specified block(s) to non-writable,
   wherein each user-addressable block of storage is mapped to at least one block of rewritable storage and initializing selected user-addressable blocks of storage to a writable state includes storing predetermined bit patterns into the corresponding blocks of rewritable storage such that for each selected user-addressable block of storage, the contents of the corresponding blocks of rewritable storage satisfy a predetermined mathematical relationship.

2. The method of claim 1 wherein determining if the specified block(s) is writable includes testing if the contents of the corresponding blocks of rewritable storage satisfy the predetermined mathematical relationship.

3. The method of claim 2 wherein the mathematical relationship is logical negation.

4. The method of claim 2 wherein determining if the specified block(s) is writable is mathematically integrated with the actual operation of storing data in the block so that data can only be stored in a block if its state is writable.

5. The method of claim 4 wherein storing the accepted data to the rewritable storage includes
   reading the contents of the blocks of rewritable storage corresponding to the specified block(s); p1 performing a mathematical function of the contents read and the accepted data; and p1 storing the computed result in the blocks of rewritable storage corresponding to the specified block(s).

6. The method of claim 5 wherein the mathematical function is a majority vote.

7. A method for ensuring that data stored on rewritable storage is immutable, including: p1 initializing selected user-addressable blocks of storage to a writable state; p1 accepting data to be stored in specified user-addressable blocks; p1 determining if the specified block(s) is writable; p1 storing the accepted data to the rewritable storage; and p1 setting the state of the specified block(s) to non-writable, wherein the state of the user-addressable blocks is kept external to the data being stored in the user-addressable blocks, and
   wherein mathematical functions of the state are generated and maintained in a non-user-addressable portion of the storage system.

8. The method of claim 7 wherein the state is stored in a distributed fashion in the rewritable storage, wherein the distribution of the state provides for the state being more closely located to the corresponding storage blocks.

* * * * *